United States Patent [19]
Yoshida

[11] Patent Number: 5,740,275
[45] Date of Patent: Apr. 14, 1998

[54] METHOD AND APPARATUS FOR PROCESSING CHARACTERS USING PATTERN DATA CONVERSION

[75] Inventor: Masayuki Yoshida, Yokohama, Japan

[73] Assignee: Canon Kabushiki Kaisha, Tokyo, Japan

[21] Appl. No.: 144,549

[22] Filed: Nov. 1, 1993

Related U.S. Application Data

[63] Continuation of Ser. No. 921,364, Jul. 28, 1992, abandoned, which is a continuation of Ser. No. 668,150, Mar. 12, 1991, abandoned.

[30] Foreign Application Priority Data

Mar. 14, 1990 [JP] Japan .................................. 2-64973

[51] Int. Cl.$^6$ .................................................. G06K 9/48
[52] U.S. Cl. .................................................. 382/197
[58] Field of Search ........................... 382/21–25, 56; 345/128, 142–144; 395/141, 142, 150, 151; 340/731, 729, 747; 364/518, 521; G06K 9/46, 9/48, 9/50; G06F 15/00; G09G 1/06

[56] References Cited

U.S. PATENT DOCUMENTS

| | | | |
|---|---|---|---|
| 4,748,443 | 5/1988 | Uehara et al. | 340/731 |
| 4,907,282 | 3/1990 | Daly et al. | 340/731 |
| 4,912,659 | 3/1990 | Liang | 340/747 |
| 4,930,092 | 5/1990 | Reilly | 340/729 |

FOREIGN PATENT DOCUMENTS 2203613  10/1988  United Kingdom ........... H04N 1/411

OTHER PUBLICATIONS

Computer Graphics and Image Processing, "Character Generation By Computer", Ph. Coueignoux, vol. 16, pp. 240–269 (1981).

Primary Examiner—Jose L. Couso
Attorney, Agent, or Firm—Fitzpatrick, Cella, Harper & Scinto

[57] ABSTRACT

A character processing apparatus for converting data stored in a vector form into a pattern of a dot form and outputting comprises: a discriminating circuit to discriminate the number of points constructing curve data in the data of the vector form; and a selector to select the kind of curve to be generated in accordance with the number of points constructing the curve data on the basis of the discrimination result by the discriminating circuit. A Bezier curve or a B spline curve is selected as a curve to be generated.

27 Claims, 11 Drawing Sheets

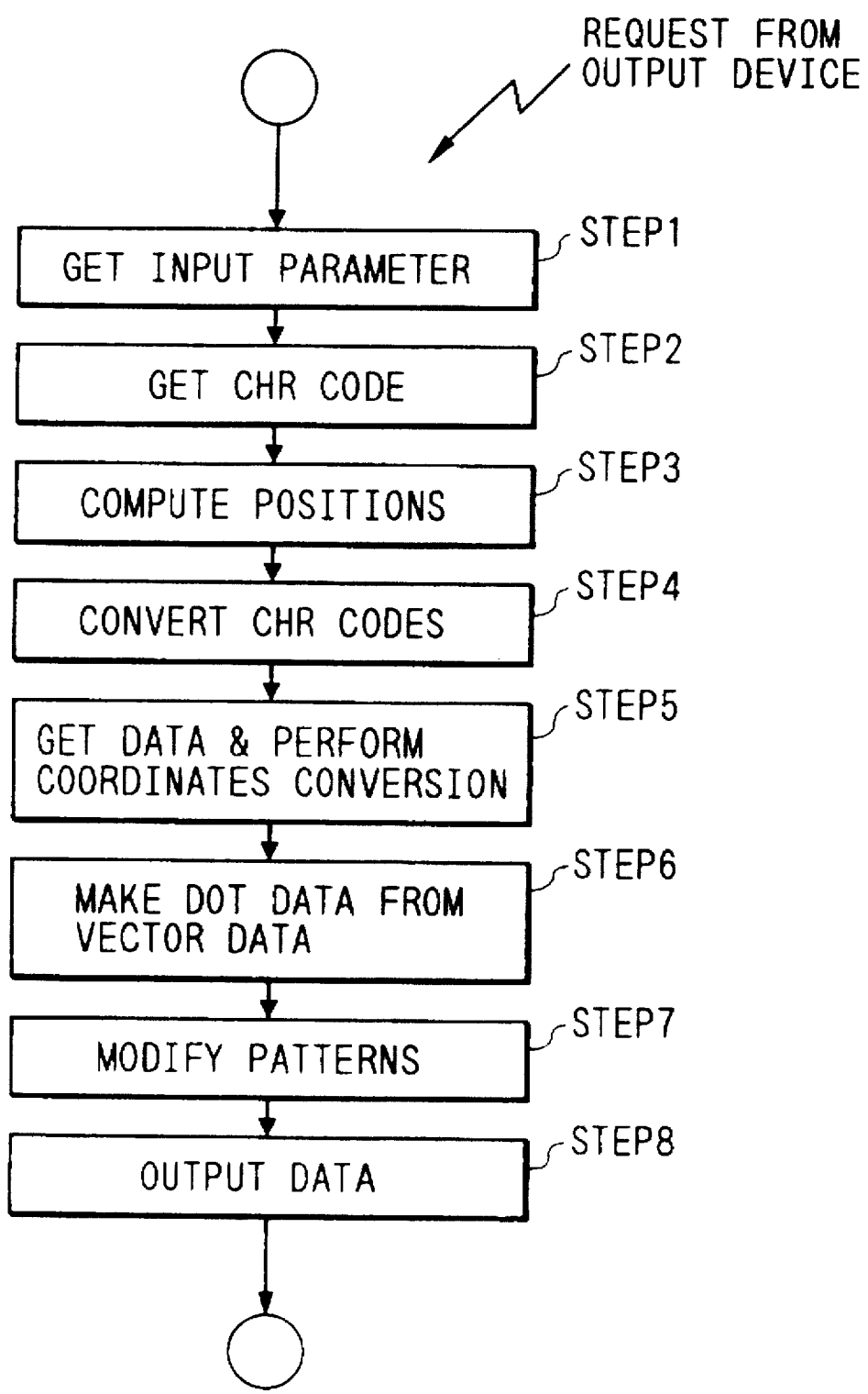

FIG. 3

```
                            POINT NO.  CHR COLOR   BACKGROUND
                                                    COLOR
◆◆◆◆◆◆◆◆◆◆◆◆◆◆◆◆◆◆◆
    ◆ OUTLINE      20      (BK)    (BK)           ◆
MODIFIED CHR TRAIN      ◆ OUTLINE FONT                            ◆
MODIFICATION PARAMETERS ◆ CH 1 TI 0 BG03 SH03 ST 0                ◆
MODIFICATION PARAMETERS ◆ MI 0 DR 0 RT000                         ◆
◆◆◆◆◆◆◆◆◆◆◆◆◆◆◆◆◆◆◆
```

CH: DESIGNATE MESH PATTERN FOR CHR

TI: DESIGNATE KINDS OF TILTED TYPE

BG: DESIGNATE KINDS OF BACKGROUND & MESH PATTERN

SH: DESIGNATE KINDS OF SHADOW & MESH PATTERN

ST: DESIGNATE TYPE STYLE

MI: DESIGNATE MIRROR IMAGE

DR: DESIGNATE DIRECTION OF CHR TRAIN

RT: DESIGNATE ROTATIONAL ANGLE OF 1 CHR

INITIAL DATA : 4 POINTS
$(P_0, P_1, P_2, P_3)$ $$q = \frac{1}{2}(P_1, P_2)$$

$$\begin{cases} Q_0 = P_0 \\ Q_1 = \frac{1}{2}(P_0, P_1) \\ Q_2 = \frac{1}{2}(Q_1, q) \\ Q_3 = \frac{1}{2}(Q_2, R_1) \end{cases} \qquad \begin{cases} R_3 = P_3 \\ R_2 = \frac{1}{2}(P_2, P_3) \\ R_1 = \frac{1}{2}(q, R_2) \\ R_0 = \frac{1}{2}(Q_2, R_1) \end{cases}$$

$f_0$ AND $f_1$ : 3RD ORDER FUNCTION

INITIAL DATA : 3 POINTS
$(P_0, P_1, P_2)$ $Q_0 = P_0 \qquad R_2 = P_2$ $Q_1 = \frac{1}{2}(P_0, P_1) \qquad R_1 = \frac{1}{2}(P_2, P_1)$ $Q_2 = R_0 = \frac{1}{2}(Q_1, R_1)$

1 ~ 2 : STRAIGHT
2 ~ 6 : CURVE
6 ~ 9 : CURVE
9 ~ 10: STRAIGHT
10 ~ 1 : STRAIGHT

| POINT | ATTRIBUTES 1bit |
|---|---|
| 1 | 0 |
| 2 | 0 |
| 3 | 1 |
| 4 | 1 |
| 5 | 1 |
| 6 | 0 |
| 7 | 1 |
| 8 | 1 |
| 9 | 0 |
| 10 | 0 |

0: NON-INTERMEDIATE POINT
1: INTERMEDIATE POINT ON A CURVE

| | X COORDINATES | Y COORDINATES |
|---|---|---|
| 1 | x₁ | y₁ |
| 2 | x₂ | y₂ |
| 3 | x₃ | y₃ |

| | X COORDINATES | Y COORDINATES |
|---|---|---|
| PROVISIONAL POINT | x₁ | y₁ |
| 1 | x₁ | y₁ |
| 2 | x₂ | y₂ |
| 3 | x₃ | y₃ |

5,740,275

METHOD AND APPARATUS FOR PROCESSING CHARACTERS USING PATTERN DATA CONVERSION

This application is a continuation of application Ser. No. 07/921,364 filed Jul. 28, 1992, now abandoned, which is a continuation of application Ser. No. 07/668,150, filed Mar. 12, 1991, abandoned.

BACKGROUND OF THE INVENTION

1. Field of the Invention

The present invention relates to character processing method and apparatus to convert a pattern which was encoded in vector form into a dot form.

2. Related Background Art

Hitherto, when data of a vector form is converted into data of a dot form, such a conversion is executed by one curve generating process for all of the curve data.

However, in the process to generate a curve, if one curve is generated, it requires long processing time depending on the number of points constructing the curve. There is a problem such that the time required to convert vector form data into dot form data is too long.

SUMMARY OF THE INVENTION

To solve the above problems, it is an object of the invention to provide character processing method and apparatus comprising: discriminating means for discriminating the number of points constructing curve data and selecting means for selecting the kind of curve to be generated on the basis of the curve data in accordance with the result of the discrimination of the discriminating means.

BRIEF DESCRIPTION OF THE DRAWINGS

FIG. 2 is a flowchart showing a whole flow of the invention;

FIG. 3 is a diagram showing areas assembled on a screen of a document;

DETAILED DESCRIPTION OF THE PREFERRED EMBODIMENTS

An embodiment of the invention will now be described. The invention can be embodied in a system comprising a plurality of apparatuses or one apparatus. The invention can be also applied to the case which is embodied by supplying a program to an apparatus, a system, or the like. Any one of the laser beam printer, bubble jet printer, thermal copy transfer printer, and the like can be used as a printer for use in the invention.

Figure 1:
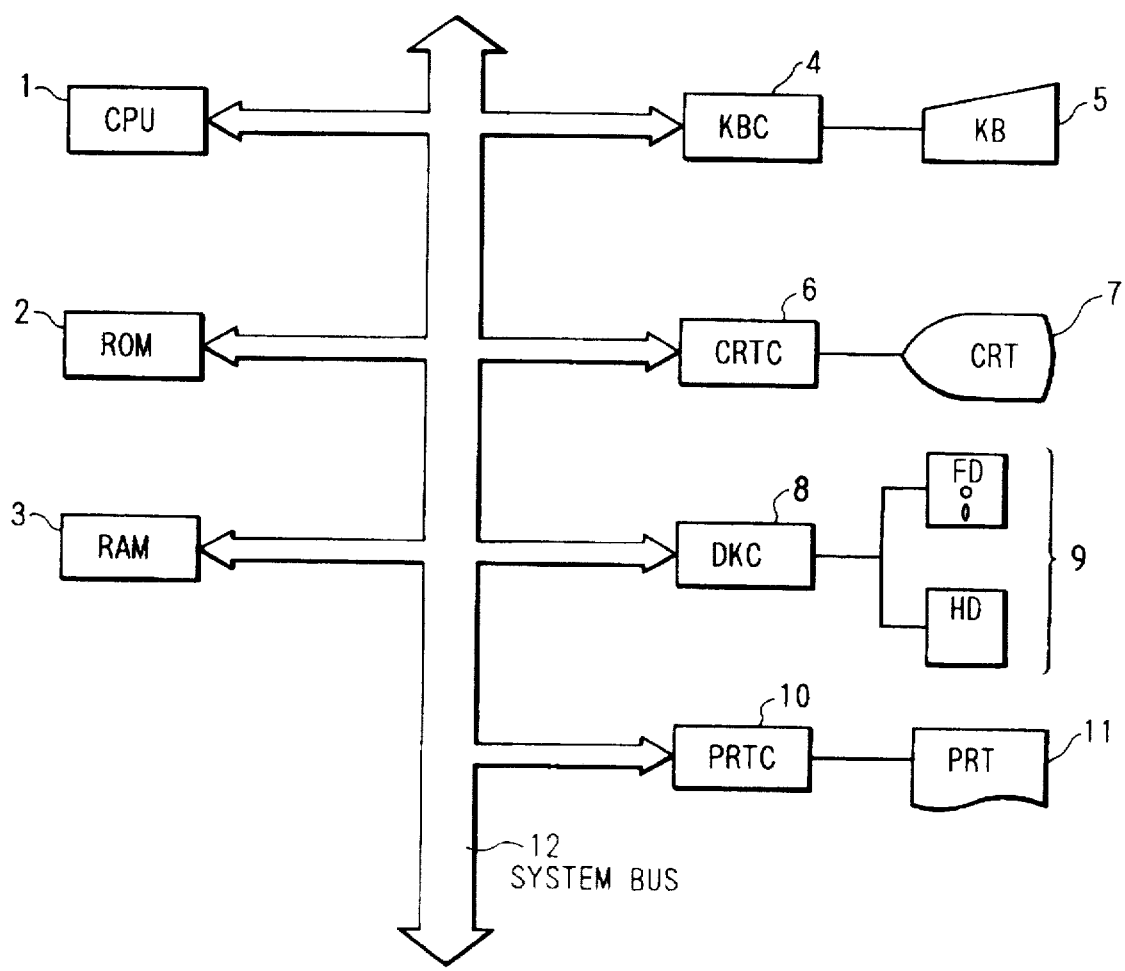
FIG. 1 is a block diagram showing an internal construction of the invention.

FIG. 1 is a block diagram showing a fundamental construction of a Japanese word processor according to the invention. In FIG. 1, reference numeral 1 denotes a central processing unit (CPU) to control the entire apparatus and to execute arithmetic operating processes and the like; 2 indicates a read only memory (ROM) as a memory area to store a system activation program, character pattern/data, and the like; and 3 a random access memory (RAM) as a data memory area without a use limitation. Each of programs shown in flowcharts, which will be explained hereinafter, is executed and data are stored in the RAM 3 for every process. Reference numeral 4 denotes a keyboard control section (KBC) and 5 indicates a keyboard (KB). The KBC 4 receives key input data from the keyboard 5 and transfers the input data to the CPU 1. Reference numeral 6 denotes a display control section (CRTC); 7 a display device (CRT) to receive data from the CRTC 6 and display; and 9 an external memory device such as floppy disk device (FD), hard disk device (HD), or the like. The programs shown in the flowcharts, which will be explained hereinafter, are executed and data are stored in the external memory device 9. Upon execution, those programs and data are referred to and stored into the RAM as necessary. Reference numeral 8 denotes a disk control section (DKC) to control a data transmission or the like; 10 a printer control section (PRTC); 11 a printer (PRT); and 12 a system bus serving as a data path among the above component elements. The operation of the embodiment with the above construction will now be described with reference to the flowchart of FIG. 2 and FIG. 3.

In step 1 in FIG. 2, information which is supplied from an output device side is obtained as input parameters.

As parameters which are supplied in this case, there are a size of entire output area, information of an actual output area (left edge and right edge), and the like.

In step 2, there is executed a process to read information such as point No., character train, kind of modification, and the like which have already been written in an area to convert the data of a vector form assembled in a document picture plane as shown in FIG. 3 into the data of a dot form. Any one of the ruled line, table, box layout, and the like can be used as an area which is used in the embodiments.

In step 3, the right and left edges of the area which is occupied by each character of a designated character train are calculated. A practical example will now be described with reference to the flowchart of FIG. 9 and FIGS. 10 to 12.

Figure 9:
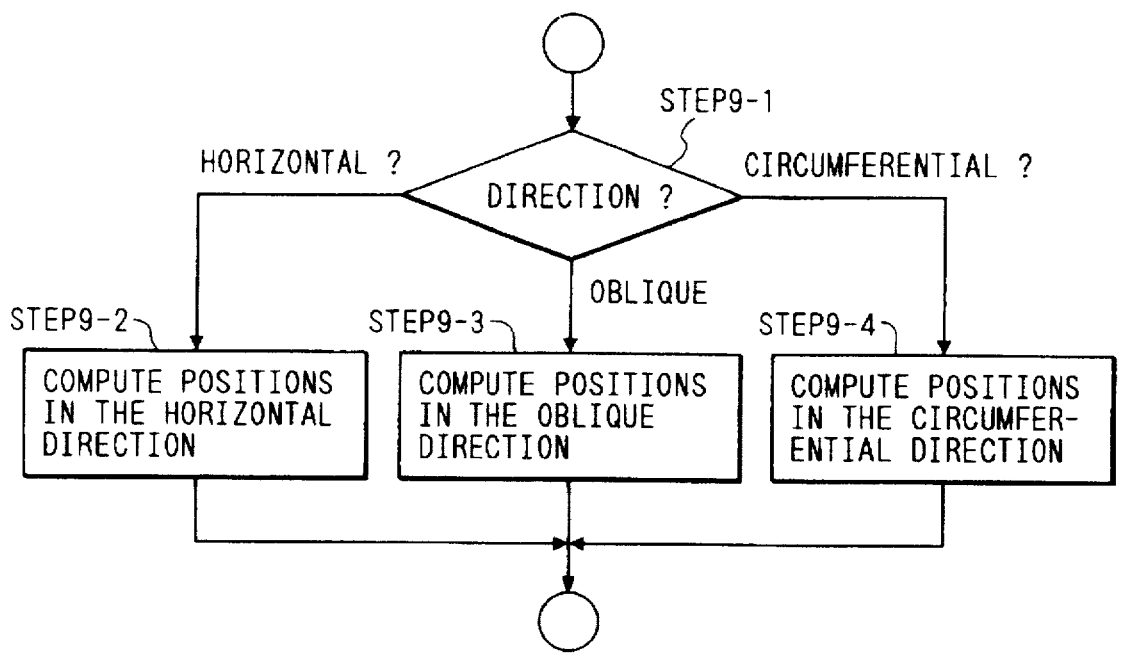
FIG. 9 is a flowchart showing a flow to calculate an arrangement position by the direction of a character train.

In step 9-1 in FIG. 9, the direction of the character train in the modification information obtained in step 2 in FIG. 2 is discriminated. If the direction of the character train is determined to be the horizontal direction, step 9-2 follows. If it is the oblique direction, step 9-3 follows. If it is the circumferential direction, step 9-4 follows.

Figure 10:
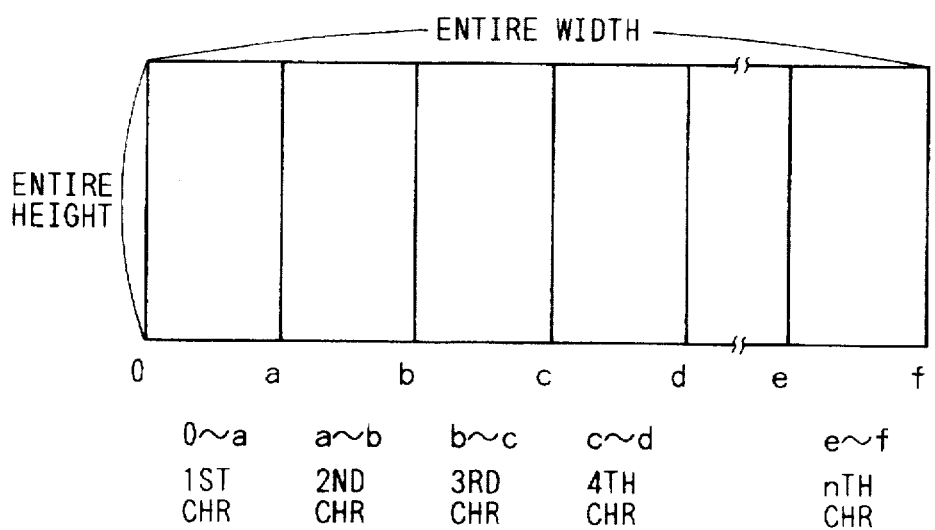
FIG. 10 is a diagram showing a state in which arrangement positions of characters are calculated when a character train is arranged in the horizontal direction.

Step 9-2 relates to the case of arranging the character train in the horizontal direction as shown in FIG. 10. A size of entire lateral area to generate the character train is divided by the number of characters, thereby allowing the characters to be uniformly arranged. Then, coordinate values of the right and left edges of an area which is occupied by each character are stored.

Figure 11:
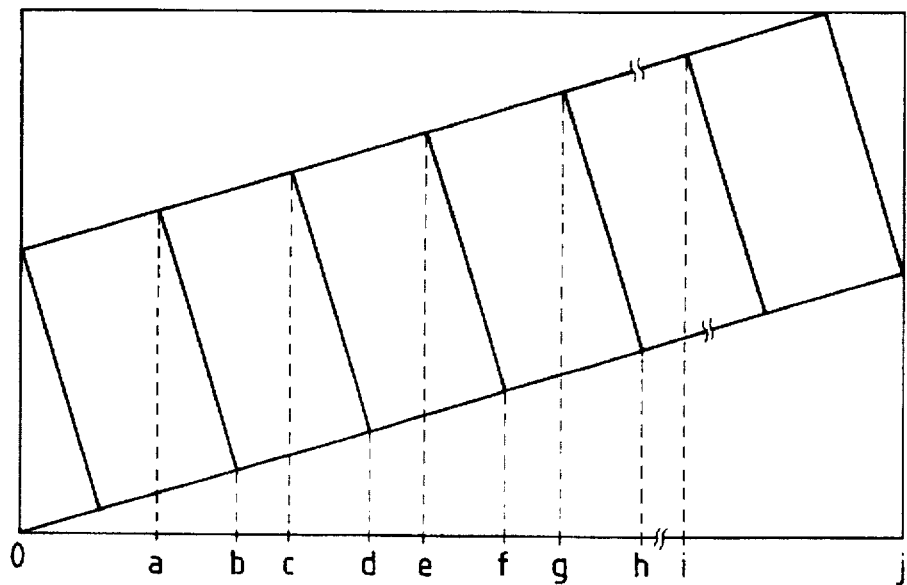
FIG. 11 is a diagram showing a state in which arrangement positions of characters are calculated when a character train is arranged in the oblique direction.

Step 9-3 relates to the case of arranging the character train in the oblique direction as shown in FIG. 11. A size of area to obliquely generate the character train is first calculated from the size of entire area to generate the character train. The area to obliquely generate the character train is uniformly divided into the small areas as many as the number of characters. Coordinate values of the right and left edges of the area which is occupied by each character are stored.

Figure 12:
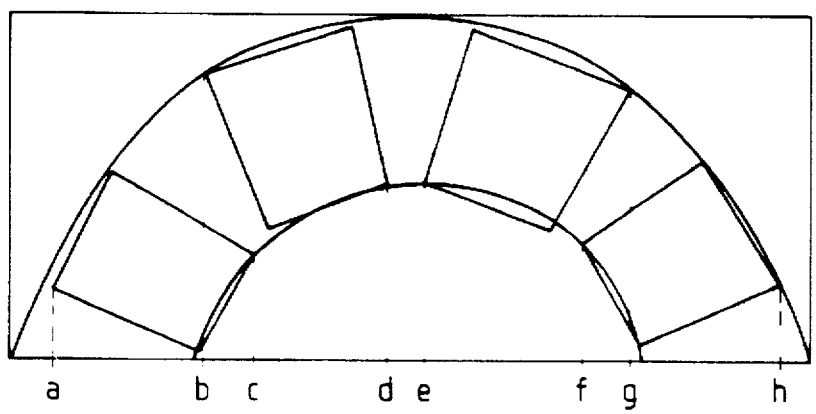
FIG. 12 is a diagram showing a state in which arrangement positions of characters are calculated when a character train is arranged in the circumferential direction.

Step 9-4 relates to the case of arranging the character train in the circumferential direction as shown in FIG. 12. The area to arrange the character train is similarly calculated from the entire area and the area which is occupied by each character is calculated so as to enable the characters to be uniformly arranged. The example of FIG. 12 differs from the examples of FIGS. 10 and 11 with respect to the following point. That is, in the examples of FIGS. 10 and 11, the sizes of lateral areas which are occupied by the characters are uniform. However, in the case of the example of FIG. 12, those sizes differ in dependence on an angle at which the character is arranged.

In step 4 in FIG. 2, the value of the lateral area which is occupied by each character and has been stored in step 3 is compared with the value of the lateral area which is used to actually generate the character and was supplied from the output device side, only the necessary data in the character train to be developed is used as it is, and the unnecessary data is converted into the space code.

Figure 13:
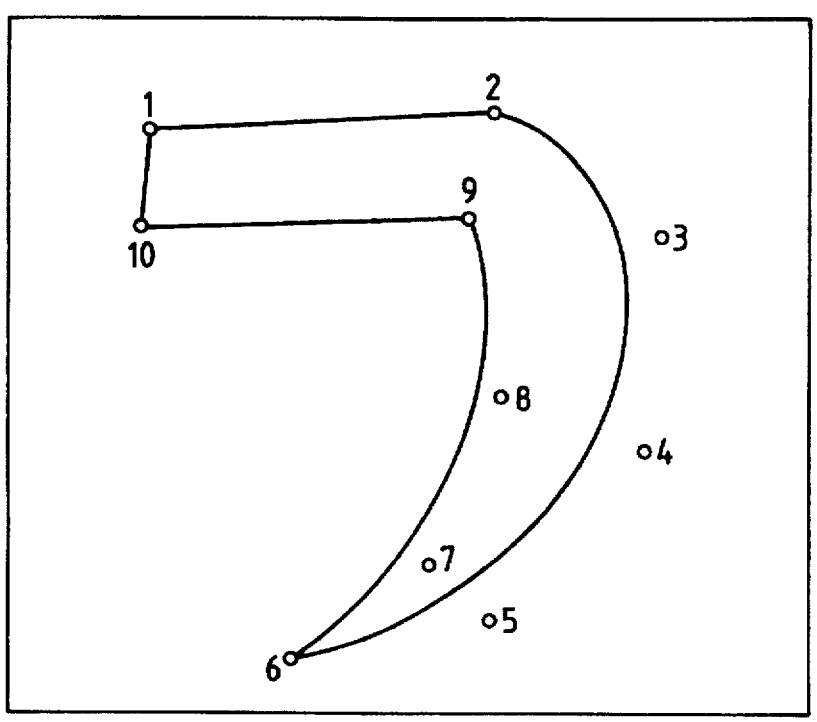
FIG. 13 is a diagram showing the relation between the vector point and the point attributes.

In step 5 in FIG. 2, the character code train which is obtained after the conversion in step 4 was executed is referred to, and if the character code is a code other than the space code, the data of the vector form corresponding to the character code and the point attributes such as straight line/curve and the like which are expressed by a form as shown in FIG. 13 are read and stored into the memory device and the conversion of the x and y coordinate values as data of the vector form is executed in accordance with the size of character and the kind of modification which were read in step 2. If the character code is the space code, no process is executed.

In step 6, the data of the dot form is produced on the basis of the x/y coordinate data stored in the memory device in step 5. Processes in this case will be described hereinlater with reference to the flowchart of FIG. 4 as an example.

In step 7, a modifying process to add a mesh image, a background image, or the like to the data on the basis of the modification information which was read in step 2 is executed to on the data which was converted into the data of the dot form.

In step 8, a necessary portion in the data of the dot form which was formed in step 7 is transferred to the memory device on the output side.

Figure 4:
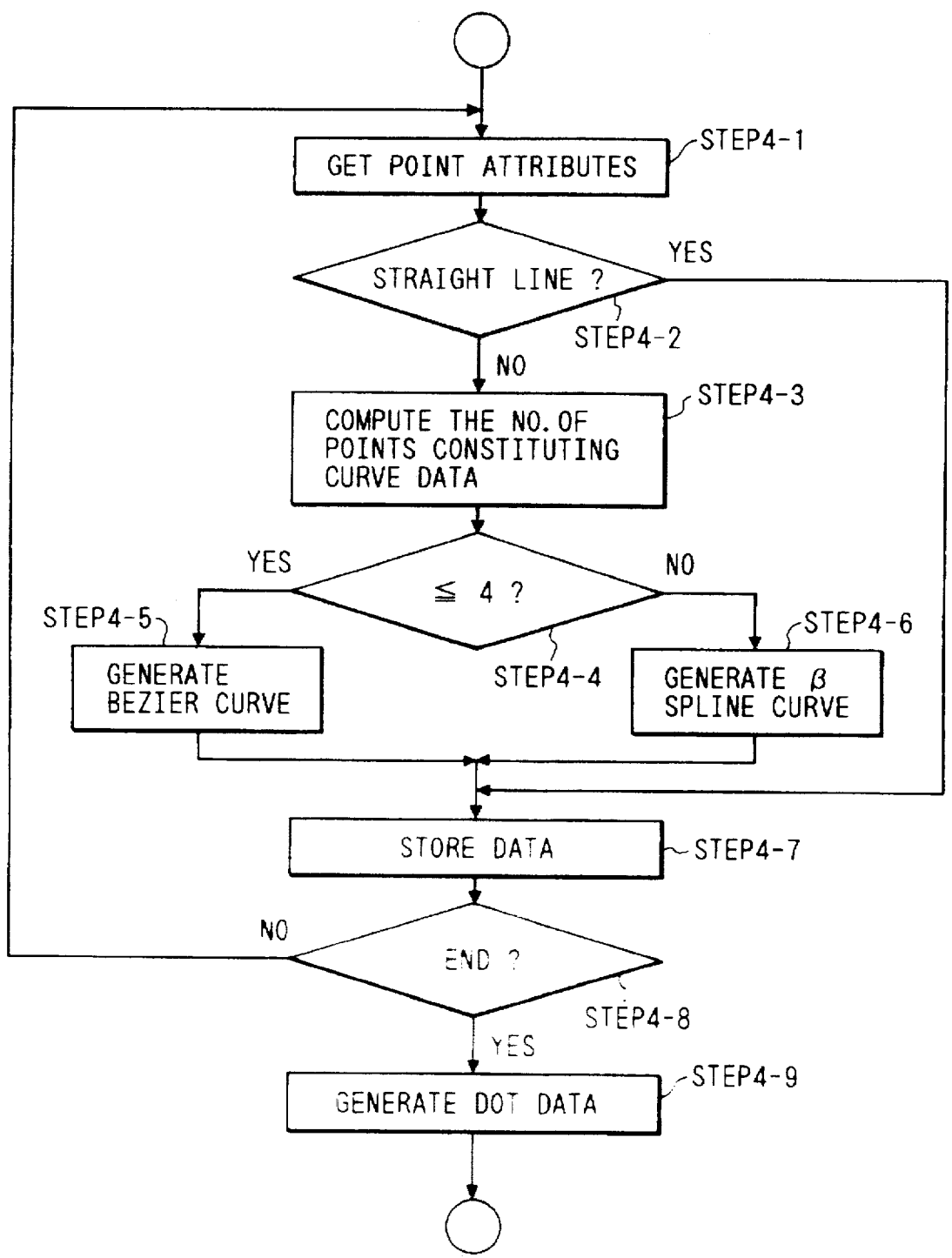
FIG. 4 is a flowchart showing a detailed flow of the invention.

FIG. 4 is the flowchart to explain in detail the process in step 6 in FIG. 2.

In step 4-1 in FIG. 4, the point attributes obtained in step 4 in FIG. 2 are read out.

In step 4-2, a check is made to see if an objective point relates to straight line data or curve data. If it relates to the straight line data, step 4-7 follows. If it relates to the curve data, step 4-3 follows.

As will be understood from FIG. 13, the discrimination regarding the straight line or curve is performed in the following manner. That is, if both of the point attributes of the objective point and the next point are equal to 0, it is determined that the objective point and the next point relate to a straight line. If the point attributes of the objective point are equal to 0 and the point attributes of the next point are equal to 1, the points within a range from such a point having the point attributes of 1 to a point whose point attributes are first equal to 0 by subsequently searching the point attributes are regarded to be the points with respect to a curve.

In step 4-3, the number of points constructing the curve data is calculated. Such a number can be calculated by counting the number of continuous points having the point attributes of the continuous curve data from the point having the point attributes which was determined to be a curve in step 4-1. That is, the number of points having the point attributes of 1 is counted and 2 is added to the count value. The resultant value indicates the number of points constructing the curve. In the example of FIG. 13, the points from point 2 to point 6 construct one curve (the number of points constructing the curve is equal to 5 and the number of continuous points having the point attributes of 1 is equal to 3). On the other hand, the points from point 6 to point 9 construct one curve (the number of points forming the curve is equal to 4 and the number of continuous points having the point attributes of 1 is equal to 2).

in step 4-4, a check is made to see if the curve data is constructed by four points or less or by points larger than four points. If the curve is constructed by four points or less (in the example of FIG. 13, the curve between point 6 to point 9), step 4-5 follows. If the curve is constructed by points larger than four points (in the example of FIG. 13, the curve between point 2 to point 6), step 4-6 follows.

Figure 5:
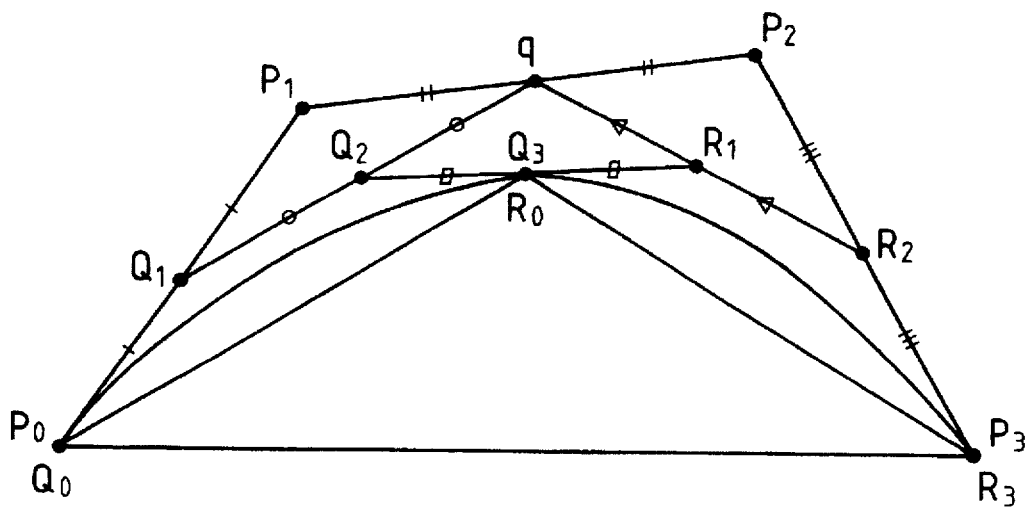
FIG. 5 is a diagram showing a state in which a curve is generated by a third order Bezier function.
Figure 14:
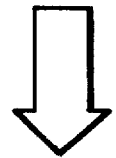
FIG. 14 is a diagram showing an example of providing provisional points in the case where a curve is constructed by three points.

In step 4-5, a curve is generated by a Bezier function in the case as shown in FIG. 5. Since the Bezier function is generated by four points, for a curve which is constructed by three points, a provisional point is provided at a proper position as shown in FIG. 14 and a curve generating process is executed by setting four points.

Figure 6:
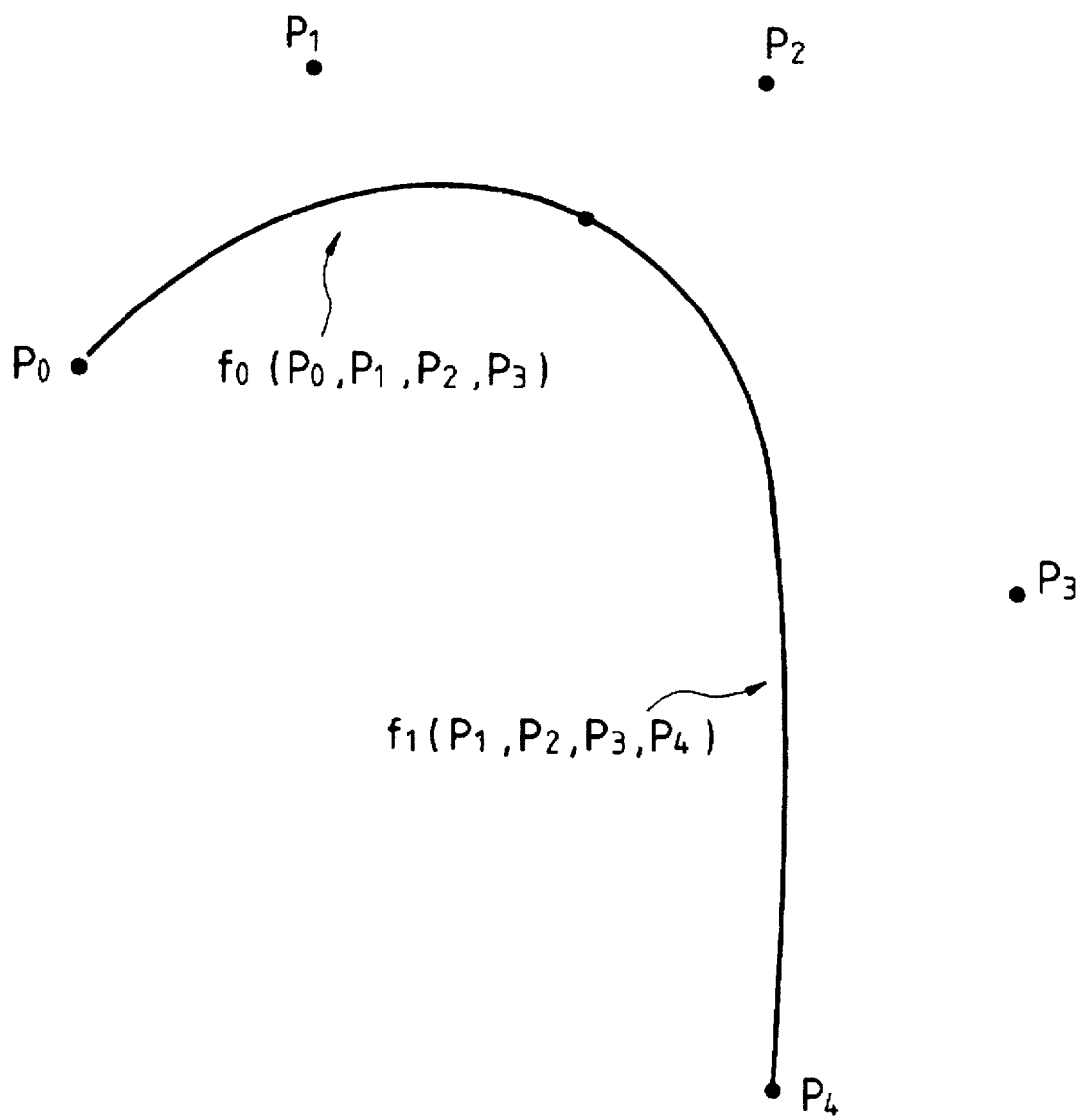
FIG. 6 is a diagram showing a state in which a curve is generated by a B spline function.

In step 4-6, a curve is generated by a B spline function as shown in FIG. 6.

In step 4-7, the necessary values in the x and y coordinate values of the curves generated in steps 4-5 and 4-6 are stored.

The x and y coordinate values of the data which was determined to be the straight line data in step 4-2 are stored.

In step 4-8, a check is made to see if data to be discriminated exists or not. If no data to be discriminated exists, step 4-9 follows. If any data to be discriminated still exists, the processing routine is returned to step 4-1 and the next data is processed. In step 4-9, x and y coordinate data stored in the steps until step 4-8 are read out and the data of the dot form is produced on the basis of the x and y coordinate data.

[Another embodiment]

The above embodiment has been described with respect to the case where a curve is generated by a third order Bezier function when the number of points constructing a curve is four or less and where a curve is generated by a B spline function when the number of points constructing the curve is larger than four. However, explanation will now be made with respect to another embodiment in which curves are generated by different curve functions in the cases where the number of points constructing a curve is equal to three, where it is equal to four, and where it is equal to a value larger than four, respectively.

Figure 7:
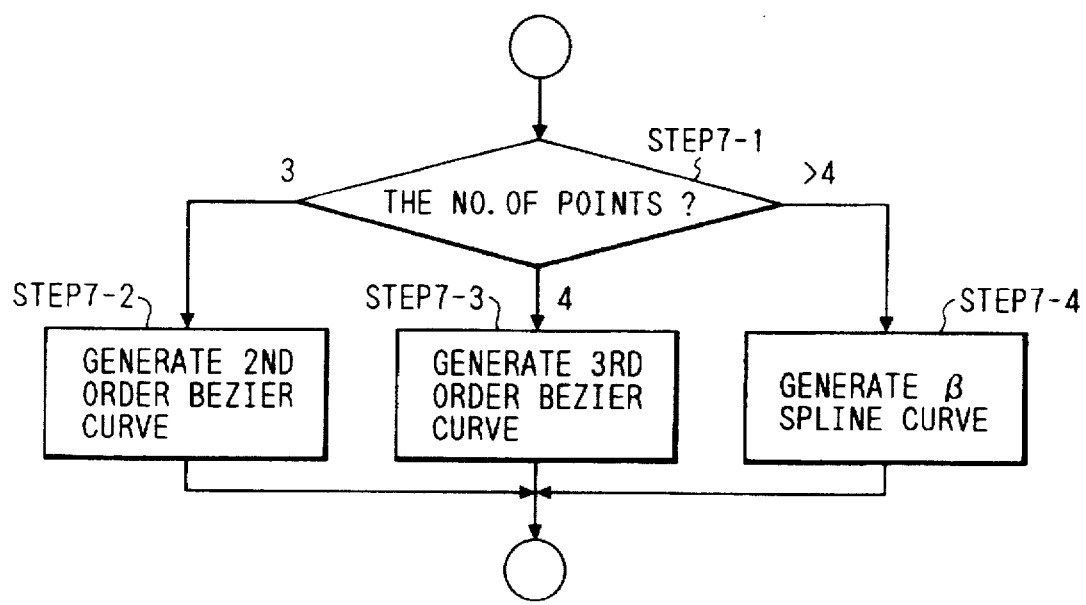
FIG. 7 is a flowchart showing a flow in another embodiment.

In the flowchart of FIG. 7, the processes in steps 4-4 to 4-6 in FIG. 4 are replaced.

The operation of another embodiment will now be described with reference to the flowchart of FIG. 7 and FIG. 8.

In step 7-1 in FIG. 7, if the number of points constructing a curve is equal to three, step 7-2 follows. If it is equal to four, step 7-3 follows. If it is larger than four, step 7-4 follows.

Figure 8:
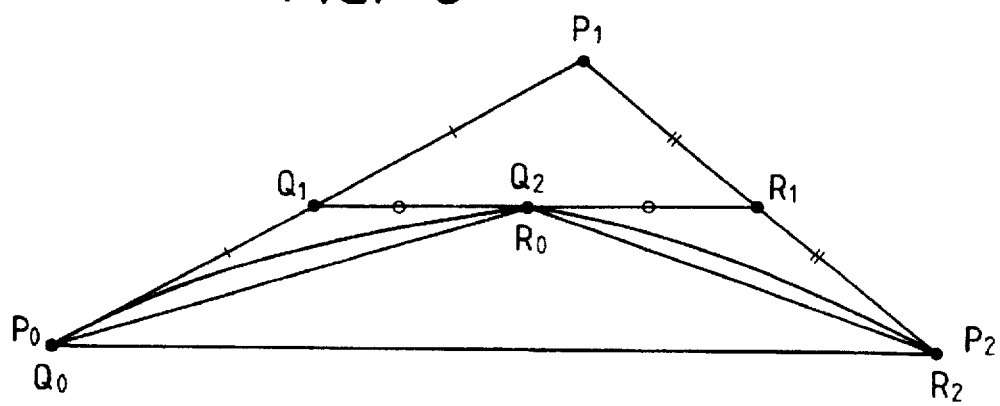
FIG. 8 is a diagram showing a state in which a curve is generated by a second order Bezier function.

In step 7-2, a curve is generated by using a second order Bezier curve function as shown in FIG. 8.

In step 7-3, a curve is generated by using a third order Bezier curve function as shown in FIG. 5 in a manner similar to that described in the foregoing embodiment.

In step 7-4, a curve is generated by using a B spline function as shown in FIG. 6 in a manner similar to that described in the foregoing embodiment.

As subsequent processes, the processing routine advances to step 4-7 in FIG. 4 in a manner similar to the foregoing embodiment and the x and y coordinate values which were converted into the curve are stored into a designated coordinate data buffer.

As mentioned above, a curve can be processed at a high speed in accordance with the number of points constructing the curve. As a final output, by generating a curve by an equivalent function, a pattern can be generated at a high speed and with a high quality.

As described in detail above, according to the invention, it is possible to provide a character processing apparatus in which by using a function to generate a proper curve in accordance with the number of points constructing a curve, a pattern of a dot form can be produced at a high speed without deteriorating the output quality.

I claim:

1. A character processing apparatus comprising:

deriving means for deriving a number of control points comprising vector form data for generation of a curve pattern relating to a character pattern to be output;

selection means for selecting a first method of generating a curve if said number of the control points derived by said deriving means is a prescribed number and for selecting a second method of generating a curve if said derived number is not the prescribed number;

generating means for generating curve data based on the control points using either one of the first and second curve generation methods selected by said selection means; and memory means for storing the curve data generated by said generating means for a subsequent output operation, wherein one of the first method of generating a curve and the second method of generating a curve is a Bezier method.

2. An apparatus according to claim 1, further comprising output means for outputting the curve data stored in said memory.

3. An apparatus according to claim 2, wherein said output means comprises a printer.

4. An apparatus according to claim 2, wherein said output means comprises a display device.

5. An apparatus according to claim 1, wherein the prescribed number is 4.

6. An apparatus according to claim 1, wherein the first and second curve generation methods use a Bezier curve and a B spline curve, respectively.

7. An apparatus according to claim 5, wherein the first and second curve generation methods use a Bezier curve and a B spline curve, respectively.

8. An apparatus according to claim 1, wherein said deriving means derives said number by counting the control points.

9. An apparatus according to claim 8, wherein said deriving means derives said number by counting the control points based on attributes of the control points for generation of a straight pattern or a curve pattern.

10. In a character processing apparatus including a processing unit and a storing unit, a character processing method comprising the steps of:

in the processing unit:

deriving a number of control points comprising vector form data for generation of a curve pattern relating to a character pattern to be output;

selecting a first method of generating a curve if said number of the control points derived is a prescribed number and selecting a second method of generating a curve if said derived number is not the prescribed number; and generating curve data based on the control points using the selected one of the first and second curve generation methods; and in the storing unit:

storing the generated curve data for a subsequent output operation, wherein one of the first method of generating a curve and the second method of generating a curve is a Bezier method.

11. A character processing method according to claim 10, further comprising the step of outputting the generated stored curve data.

12. A character processing method according to claim 11, wherein said output step outputs the stored curve data by a printer.

13. A character processing method according to claim 11, wherein said output step outputs the stored curve data by a display device.

14. A character processing method according to claim 10, wherein the prescribed number is 4.

15. A character processing method according to claim 10, wherein the first and second curve generation methods use a Bezier curve and a B spline curve, respectively.

16. A character processing method according to claim 14, wherein the first and second curve generation methods use a Bezier curve and a B spline curve, respectively.

17. A character processing method according to claim 10, wherein said deriving step comprises deriving said number by counting the control points.

18. A character processing method according to claim 17, wherein said deriving step comprises deriving said number by counting the control points based on attributes of the control points for generation of a straight pattern or a curve pattern.

19. A computer usable medium having computer readable program instruction means embodied therein for processing characters, the program instruction means comprising:

first instruction means for instructing deriving a number of control points comprising vector form data for generation of a curve pattern relating to a character pattern to be output;

second instruction means for instructing selecting a first method of generating a curve if said number of the control points derived is a prescribed number and selecting a second method of generating a curve if said derived number is not the prescribed number;

third instruction means for instructing generating curve data based on the control points using the selected one of the first and second curve generation methods; and fourth instruction means for instructing storing the generated curve data for a subsequent output operation, wherein one of the first method of generating a curve and the second method of generating a curve is a Bezier method.

20. A computer usable medium having computer readable program instruction means embodied therein according to claim 19 further comprising fifth instruction means for instructing outputting the generated stored curve data.

21. A computer usable medium having computer readable program instruction means embodied therein according to claim 20, wherein the fifth instruction means instructs outputting the stored curve data by a printer.

22. A computer usable medium having computer readable program instruction means embodied therein according to claim 20, wherein the fifth instruction means instructs outputting the stored curve data by a display device.

23. A computer usable medium having computer readable program instruction means embodied therein according to claim 19, wherein the prescribed number is 4.

24. A computer usable medium having computer readable program instruction means embodied therein according to claim 19, wherein the first and second curve generation methods use a Bezier curve and a B spline curve, respectively.

25. A computer usable medium having computer readable program instruction means embodied therein according to claim 23, wherein the first and second curve generation methods use a Bezier curve and a B spline curve, respectively.

26. A computer usable medium having computer readable program instruction means embodied therein according to claim 19, wherein the first instruction means comprises means for instructing deriving said number by counting the control points.

27. A computer usable medium having computer readable program instruction means embodied therein according to claim 26, wherein the first instruction means comprises means for instructing deriving the number by counting the control points based on attributes of the control points for generating a straight line or a curve pattern.

* * * * *

UNITED STATES PATENT AND TRADEMARK OFFICE
CERTIFICATE OF CORRECTION

PATENT NO. : 5,740,275

DATED : April 14, 1998

INVENTOR(S): MASAYUKI YOSHIDA

It is certified that error appears in the above-identified patent and that said Letters Patent is hereby corrected as shown below:

COLUMN 2
Line 23, "hereafter" should read --hereinafter--;
Line 40, "elements. The" should read --Elements. ¶ The--.

COLUMN 3
Line 9, "of entire" should read --of the entire--;
Line 52, "to on" should read --on--.

Signed and Sealed this

Tenth Day of November 1998

Attest:

BRUCE LEHMAN

Attesting Officer    Commissioner of Patents and Trademarks